United States Patent
Horiuchi (10) Patent No.: US 6,674,580 B2
(45) Date of Patent: Jan. 6, 2004

(54) ZOOM LENS AND CAMERA USING THE SAME

(75) Inventor: Akihisa Horiuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/156,957

(22) Filed: May 30, 2002

(65) Prior Publication Data

US 2003/0081323 A1 May 1, 2003

(30) Foreign Application Priority Data

Jun. 6, 2001 (JP) ........................................ 2001-171456

(51) Int. Cl.[7] ............................................... G02B 15/14
(52) U.S. Cl. ........................................ 359/687; 359/683
(58) Field of Search ................................. 359/687, 683

(56) References Cited

U.S. PATENT DOCUMENTS

| | | | | |
|---|---|---|---|---|
| 4,256,381 A | | 3/1981 | Kreitzer ..................... | 359/687 |
| 4,368,954 A | * | 1/1983 | Tsuji .......................... | 359/686 |
| 4,720,180 A | | 1/1988 | Asano et al. ............... | 359/687 |
| RE32,923 E | | 5/1989 | Kreitzer ..................... | 350/423 |
| 4,836,663 A | * | 6/1989 | Hirakawa ................... | 359/687 |
| 5,134,524 A | | 7/1992 | Hamano et al. ............ | 359/687 |
| 5,315,435 A | | 5/1994 | Horiuchi .................... | 359/554 |
| 5,341,243 A | | 8/1994 | Okuyama et al. .......... | 359/687 |
| 6,101,043 A | | 8/2000 | Kohno et al. .............. | 359/687 |
| 6,414,800 B1 | | 7/2002 | Hamano ..................... | 359/687 |

FOREIGN PATENT DOCUMENTS

| | | |
|---|---|---|
| JP | 56-114920 | 9/1981 |
| JP | 58-160913 | 9/1983 |
| JP | 62-24213 | 2/1987 |
| JP | 62-247316 | 10/1987 |
| JP | 4-14006 | 1/1992 |
| JP | 4-14007 | 1/1992 |
| JP | 4-358108 | 12/1992 |
| JP | 11-242160 | * 9/1999 |

* cited by examiner

Primary Examiner—Loha Ben
Assistant Examiner—William Choi
(74) Attorney, Agent, or Firm—Fitzpatrick, Cella, Harper & Scinto (57) ABSTRACT

A zoom lens includes, in order from the object side to the image side, a first lens unit having positive optical power, a second lens unit having negative optical power, a third lens unit which has positive optical power and which does not move for zooming, and a fourth lens unit having positive optical power. In zooming from a wide-angle end to a telephoto end, the first lens unit is moved toward the object side and the second lens unit is moved toward the image side, whereby the distance between the first and second lens units is increased. By constructing each lens unit such that the focal length, the distance between the principal points, etc., satisfy predetermined conditions, a small zoom lens having a high zooming ratio and high optical quality can be obtained.

23 Claims, 7 Drawing Sheets

ZOOM LENS AND CAMERA USING THE SAME

BACKGROUND OF THE INVENTION

1. Field of the Invention

The present invention relates to zoom lenses and optical apparatuses, such as cameras, which use the zoom lenses. More specifically, the present invention relates to a zoom lens suitable for use in optical apparatuses such as video cameras, electronic cameras including digital still cameras, and film cameras.

2. Description of the Related Art

Recently, in accordance with the increase in functionality of optical apparatuses such as video cameras using solid-state imaging devices and electronic still cameras, small, high-resolution zoom lenses are required as imaging systems for such optical apparatuses. In order to satisfy these requirements, small zoom lenses having a relatively high zooming ratio are disclosed in, for example, Japanese Patent Laid-Open Nos. 56-114920 (U.S. Pat. No. 4,256,381) and 58-160913 (U.S. Pat. No. 4,720,180). These zoom lenses include four lens units, i.e., a first lens unit having positive refractive power, a second lens unit having negative refractive power, a third lens unit having positive refractive power, and a fourth lens unit having positive refractive power, which are arranged in that order from the object side to the image side. The first, second and fourth lens units are moved for zooming. With such an arrangement, a relatively high zooming ratio can be obtained while the size of the zoom lens is reduced.

In addition, Japanese Patent Laid-Open Nos. 62-24213 and 62-247316 also disclose zoom lenses including four lens units, i.e., a first lens unit having positive refractive power, a second lens unit having negative refractive power, a third lens unit having positive refractive power, and a fourth lens unit having positive refractive power, which are arranged in that order from the object side to the image side. In these zoom lenses, the second lens unit is moved for zooming and the fourth lens unit is moved to compensate for displacement of the image plane due to zooming. The fourth lens unit is also used for focusing.

Japanese Patent Laid-Open Nos. 4-14006 (U.S. Pat. No. 5,134,524) and 4-358108 (U.S. Pat. No. 5,341,243) disclose zoom lenses including a first lens unit having positive refractive power, a second lens unit having negative refractive power, an aperture stop, a third lens unit having positive refractive power, and a fourth lens unit having positive refractive power, which are arranged in that order from the object side to the image side. In these zoom lenses, the first lens unit is moved toward the object side and the second lens unit is moved toward the image side for zooming from a wide-angle end to a telephoto end, and the fourth lens unit is moved for zooming and focusing. The aperture stop is always fixed during zooming.

Japanese Patent Laid-Open No. 11-242160 (U.S. Pat. No. 6,101,043) also discloses a zoom lens including four lens units, i.e., a first lens unit having positive refractive power, a second lens unit having negative refractive power, a third lens unit having positive refractive power, and a fourth lens unit having positive refractive power, which are arranged in that order from the object side to the image side. In this zoom lens, the first and fourth lens units are moved toward the object side and the second lens unit is moved toward the image side for zooming from a wide-angle end to a telephoto end. The third lens unit and the aperture stop are always fixed during zooming.

Japanese Patent Laid-Open No. 4-14007 (U.S. Pat. No. 5,134,524) also discloses a zoom lens including a first lens unit having positive refractive power, a second lens unit having negative refractive power, an aperture stop, a third lens unit having positive refractive power, and a fourth lens unit having positive refractive power, which are arranged in that order from the object side to the image side. In this zoom lens, the first lens unit is moved toward the object side and the second lens unit is moved toward the image side for zooming from a wide-angle end to a telephoto end, and the fourth lens unit is moved for zooming and focusing. The aperture stop is moved toward the image side for zooming from an intermediate focal length to the telephoto end.

U.S. Reissue Pat. No. 32,923 also discloses a zoom lens including a first lens unit having positive refractive power, a second lens unit having negative refractive power, an aperture stop, a third lens unit having positive refractive power, and a fourth lens unit having positive refractive power, which are arranged in that order from the object side to the image side. In this zoom lens, the first and fourth lens units are moved in the same direction for zooming, and the aperture stop is fixed during zooming.

In general, when the refractive power of each lens unit included in a zoom lens is increased, the amount by which each lens unit must be moved in order to obtain a predetermined zooming ratio is reduced. Accordingly, the size of the zoom lens can be reduced and the zooming ratio thereof can be increased at the same time.

However, when the refractive power of each lens unit is increased in this simple manner, a problem occurs in that variations in aberrations which occur during zooming are increased, and it becomes difficult to obtain high optical performance over the entire zooming range, especially when a high zooming ratio is required.

On the other hand, when rear focusing, in which lens units other than the first lens unit are used for focusing, is employed in a zoom lens, the overall size of the lens system advantageously can be reduced, focusing can be performed at high speed, etc.

However, it becomes difficult to obtain a high zooming ratio, and variations in aberrations which occur during zooming are increased. Accordingly it becomes extremely difficult to obtain high optical performance over the entire range of the distance to the object, that is, from an infinitely distant position to a close position.

Especially when a high zooming ratio is required, it becomes difficult to obtain high optical performance over the entire zooming range, and over the entire range of the distance to the object.

SUMMARY OF THE INVENTION

In order to overcome the above-described problems of zoom lenses of the known art, an object of the present invention is to provide a zoom lens in which the overall size of the lens system is reduced, which has a high zooming ratio, and which exhibits high optical performance.

In order to attain the above-described objects, a zoom lens of the present invention includes, in order from the object side to the image side: a first lens unit having positive optical power; a second lens unit having negative optical power; a third lens unit which has positive optical power and which does not move for zooming; and a fourth lens unit having positive optical power. In zooming from a wide-angle end (e.g., where the zoom lens is arranged to perform a maximum wide-angle adjustment) to a telephoto end (e.g., where the zoom lens is arranged to perform a maximum telephoto adjustment), the first lens unit is moved toward the object side and the second lens unit is moved toward the image side, whereby the distance between the first and second lens units is increased. In addition, when fW and fT are focal lengths of the overall system at the wide-angle end and the telephoto end, respectively, f2 is a focal length of the second lens unit, e3T is the distance between principal points of the third and fourth lens units at the telephoto end when an object located at infinity is in focus, f3 and f4 are focal lengths of the third and fourth lens units, respectively, and fA is defined as $fA=\sqrt{fW \cdot fT}$, at least one of the following expressions is satisfied:

$$0.17 < |f2/fA| < 0.30,$$

$$2.05 < e3T/fW < 2.96,$$

and $$0.6 < f3/f4 < 0.92.$$

Further objects, features and advantages of the present invention will become apparent from the following description of the preferred embodiments with reference to the attached drawings.

DESCRIPTION OF THE PREFERRED EMBODIMENTS

Figure 1:
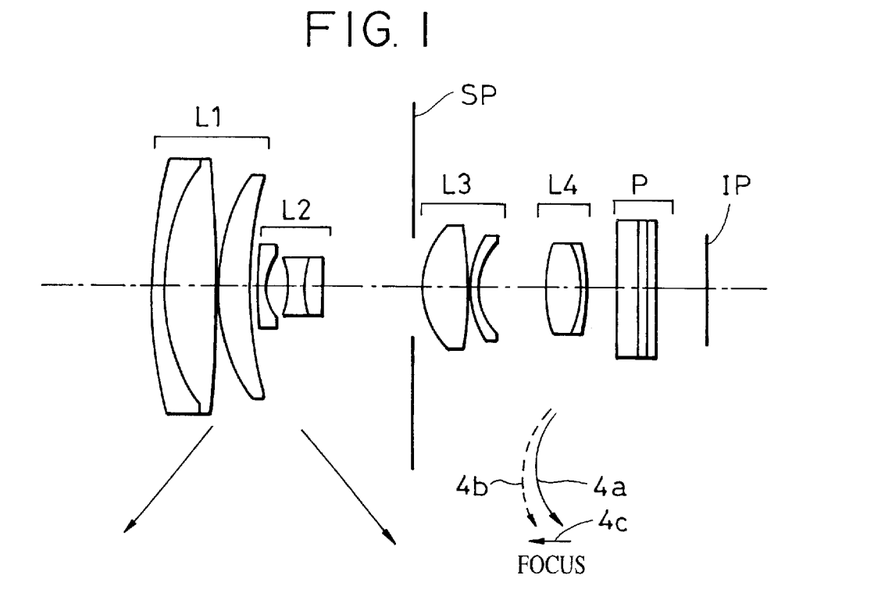
FIG. 1 is a sectional view of a zoom lens according to a first embodiment of the present invention.
Figure 2:
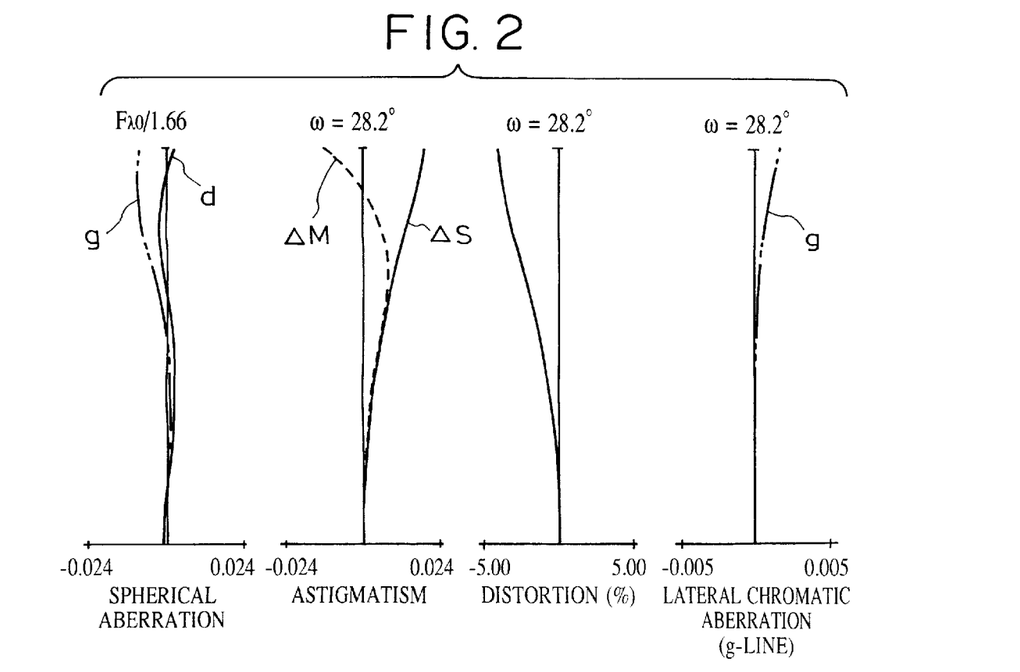
FIG. 2 is a diagram showing aberrations of the zoom lens at a wide-angle end according to the first embodiment of the present invention.
Figure 3:
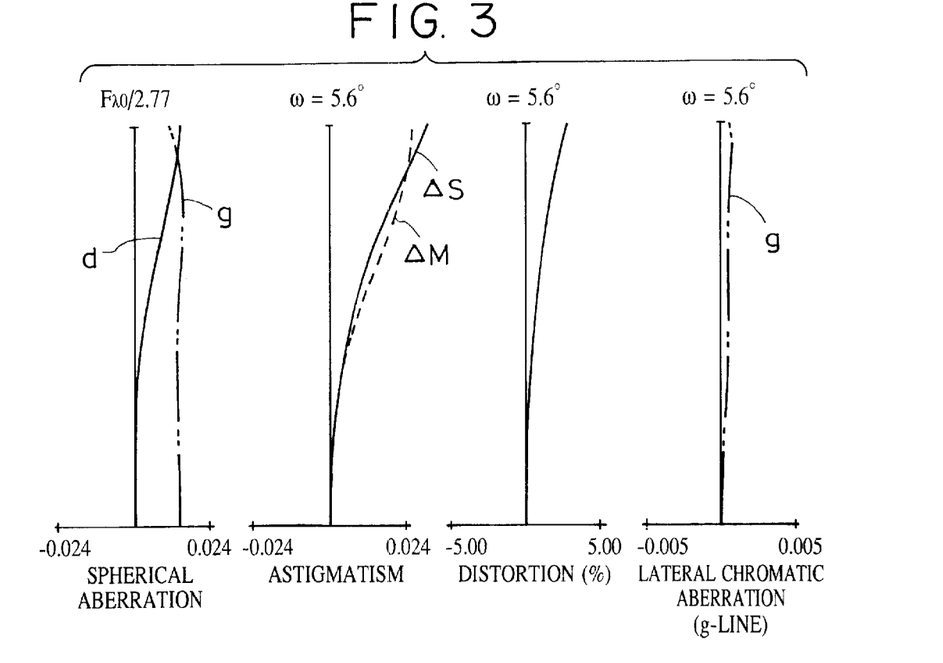
FIG. 3 is a diagram showing aberrations of the zoom lens at an intermediate focal length according to the first embodiment of the present invention.
Figure 4:
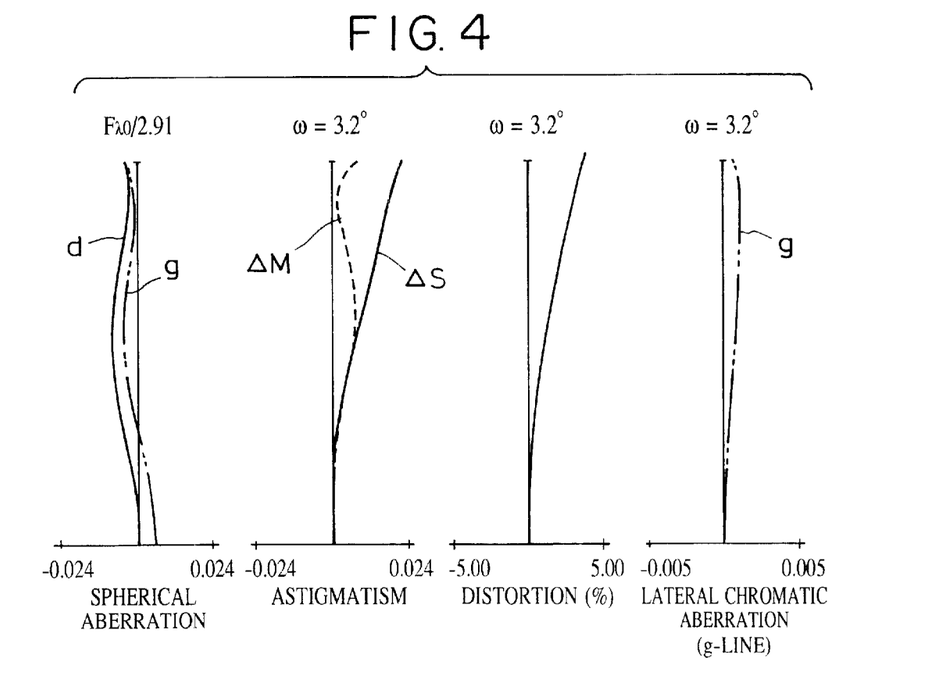
FIG. 4 is a diagram showing aberrations of the zoom lens at a telephoto end according to the first embodiment of the present invention.

FIG. 1 is a sectional view of a main part of a zoom lens according to a first embodiment of the present invention, and FIGS. 2 to 4 are diagrams showing aberrations of the zoom lens at a wide angle end, an intermediate focal length, and a telephoto end, respectively. The first embodiment corresponds to a first numerical example, which will be described below.

Figure 5:
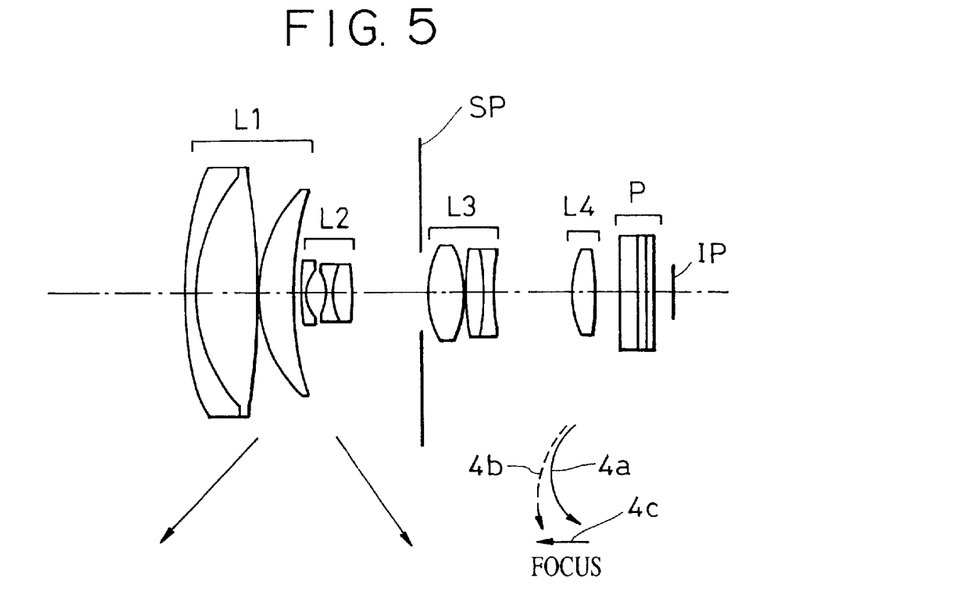
FIG. 5 is a sectional view of a zoom lens according to a second embodiment of the present invention.
Figure 6:
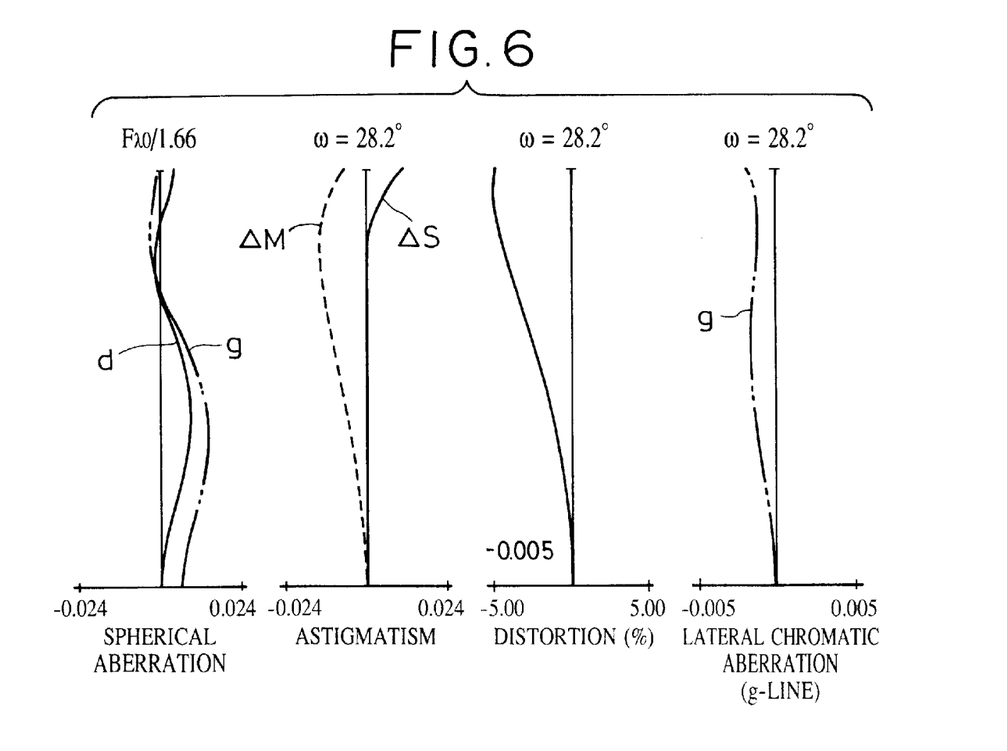
FIG. 6 is a diagram showing aberrations of the zoom lens at a wide-angle end according to the second embodiment of the present invention.
Figure 7:
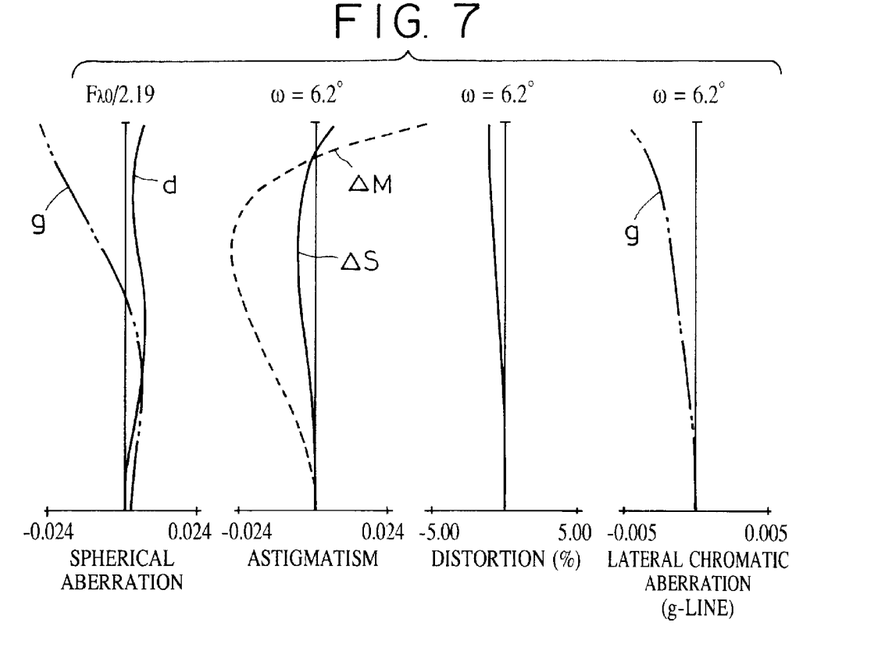
FIG. 7 is a diagram showing aberrations of the zoom lens at an intermediate focal length according to the second embodiment of the present invention.
Figure 8:
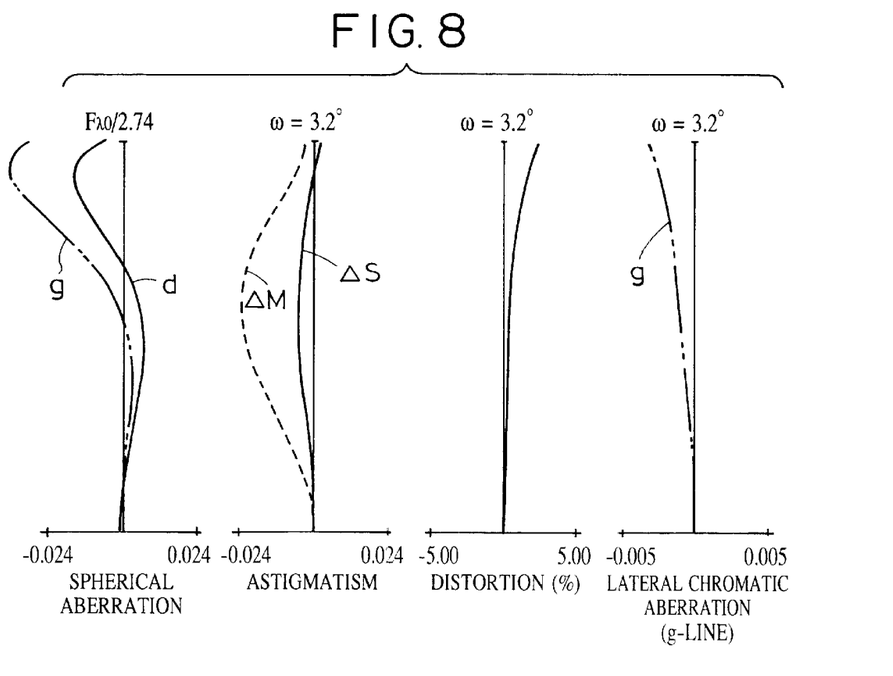
FIG. 8 is a diagram showing aberrations of the zoom lens at a telephoto end according to the second embodiment of the present invention.

FIG. 5 is a sectional view of a main part of a zoom lens according to a second embodiment of the present invention, and FIGS. 6 to 8 are diagrams showing aberrations of the zoom lens at a wide angle end, an intermediate focal length, and a telephoto end, respectively. The second embodiment corresponds to a second numerical example, which will be described below.

Figure 9:
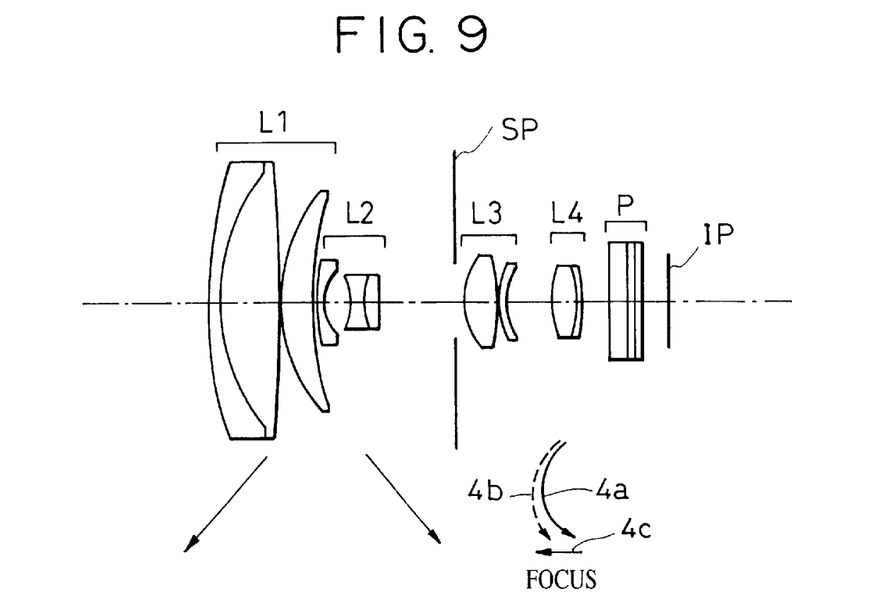
FIG. 9 is a sectional view of a zoom lens according to a third embodiment of the present invention.
Figure 10:
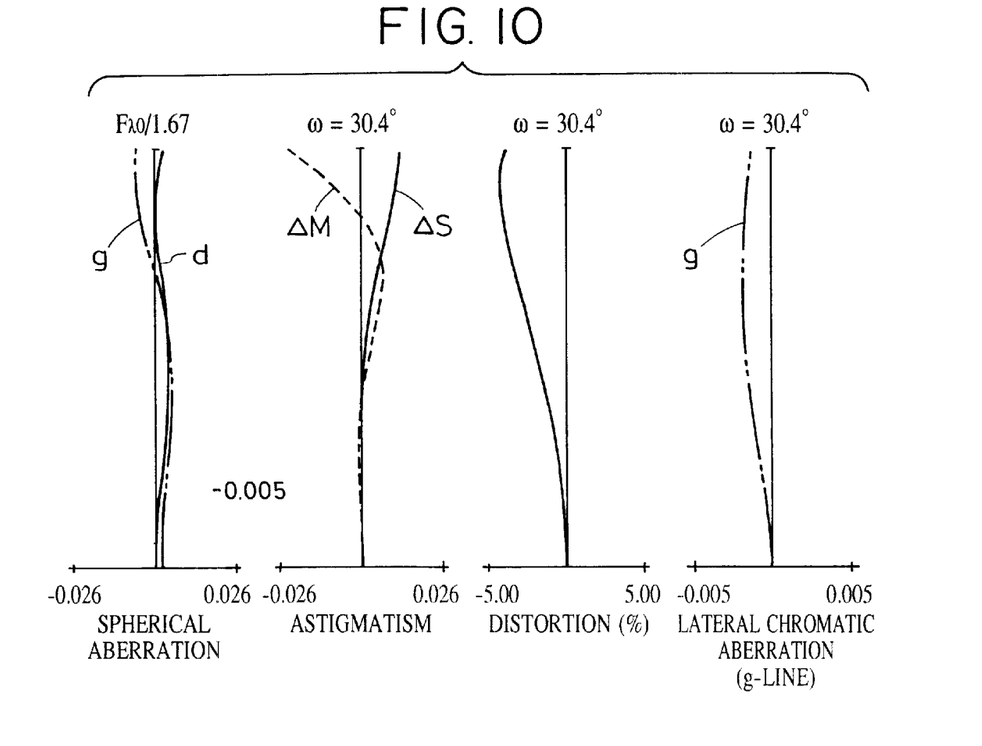
FIG. 10 is a diagram showing aberrations of the zoom lens at a wide-angle end according to the third embodiment of the present invention.
Figure 11:
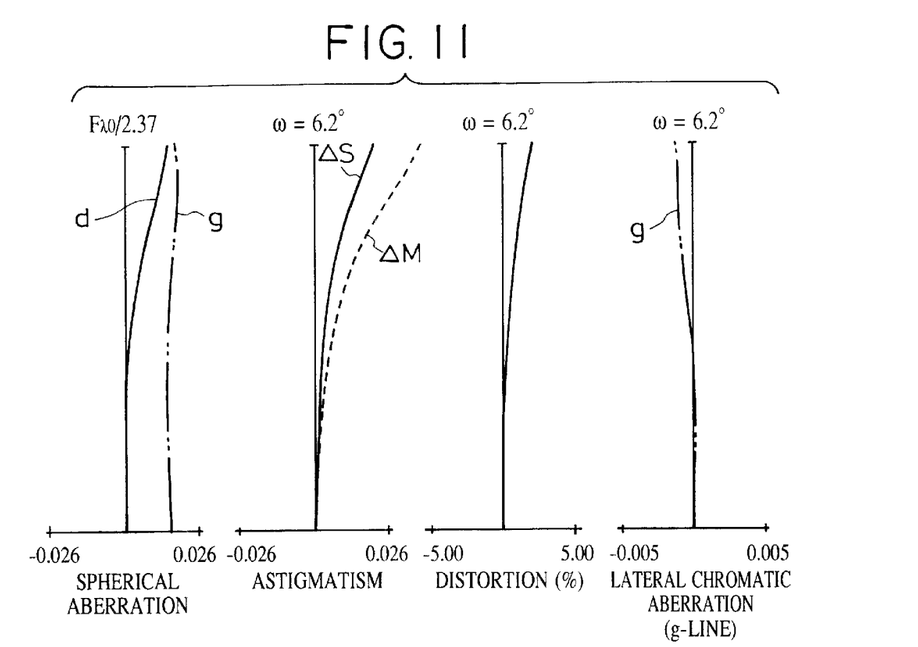
FIG. 11 is a diagram showing aberrations of the zoom lens at an intermediate focal length according to the third embodiment of the present invention.
Figure 12:
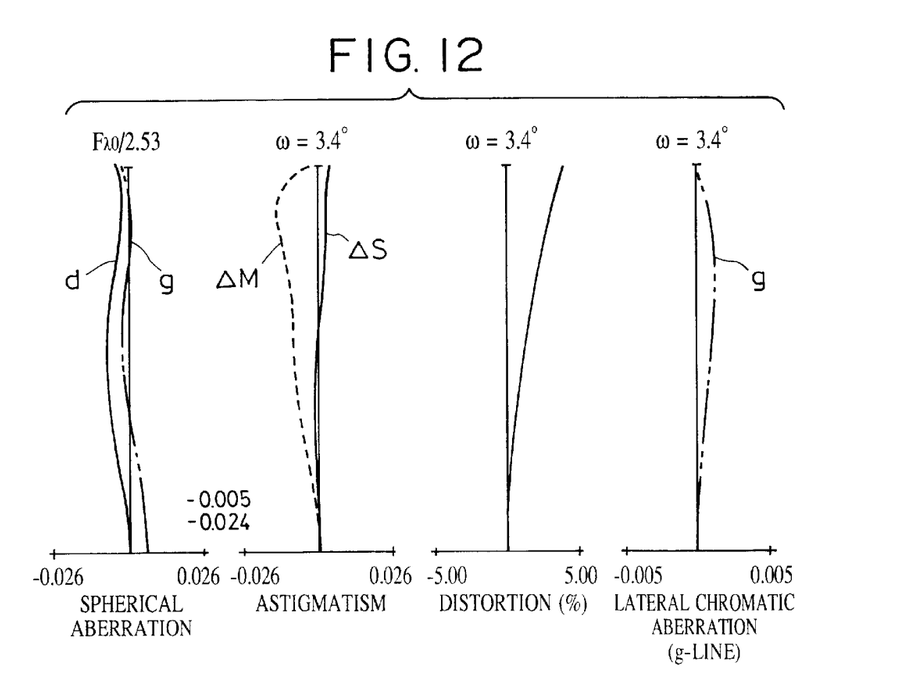
FIG. 12 is a diagram showing aberrations of the zoom lens at a telephoto end according to the third embodiment of the present invention.

FIG. 9 is a sectional view of a main part of a zoom lens according to a third embodiment of the present invention, and FIGS. 10 to 12 are diagrams showing aberrations of the zoom lens at a wide angle end, an intermediate focal length, and a telephoto end, respectively. The third embodiment corresponds to a third numerical example, which will be described below.

In each of the sectional views of the zoom lenses, L1 denotes a first lens unit having positive refractive power (refractive power is the reciprocal of the focal length), L2 denotes a second lens unit having negative refractive power, L3 denotes a third lens unit having positive refractive power, and L4 denotes a fourth lens unit having positive refractive power. SP denotes an aperture stop disposed in front of the third lens unit L3, and the aperture stop SP is fixed during zooming. In addition, P denotes a glass block including a color separation prism, a face plate, a filter, etc., and IP denotes an image plane at which a solid-state imaging device (photoelectric transducer), such as a CCD or a CMOS device, or alternatively, at which a photosensitive member, such as a film, is arranged.

In the diagrams showing aberrations, d and g represent a d-line and a g-line, respectively, and $\Delta M$ and $\Delta S$ represent a meridional image plane and a sagittal image plane, respectively. The lateral chromatic aberration is shown by the g-line.

In the first to third embodiments, in zooming from a wide-angle end to a telephoto end, as shown by the arrows in FIGS. 1, 5, and 9, the first lens unit L1 is moved toward the object side and the second lens unit L2 is moved toward the image side, whereby the distance between the first and second lens units L1 and L2 is increased. In addition, the fourth lens unit L4 is moved along a locus which is convex toward the object side so as to compensate for displacement of the image plane due to zooming.

In addition, rear focusing is employed in which the fourth lens unit L4 is moved along the optical axis for focusing. Therefore, the locus along which the lens unit L4 is moved for zooming differs in accordance with the distance to the object. In each of the sectional views of the zoom lenses shown in FIGS. 1, 5, and 9, both the solid-line curve 4a and the dotted-line curve 4b represent manners in which the fourth lens unit L4 is moved to compensate for displacement of the image plane which occurs during zooming from the wide-angle end to the telephoto end. The fourth lens unit L4 moves along a locus corresponding to the solid-line curve 4a when an object placed at an infinitely distant position is in focus, and the fourth lens unit L4 moves along a locus corresponding to the dotted-line curve 4b when an object placed at a close position is in focus. Since the fourth lens unit L4 is moved along a locus which is convex toward the object side, the space between the third lens unit L3 and the fourth lens unit L4 is efficiently utilized. Accordingly, the overall length of the lens system is effectively reduced. The third lens unit L3 is fixed during zooming and focusing.

In the first to third embodiments, when, for example, the focused position is shifted from the infinitely distant position to the close position at the telephoto end, the fourth lens unit L4 is moved forward as shown by the straight line 4c in the sectional views of the zoom lenses.

In other words, rear focusing is employed. By employing rear focusing, the effective diameter of the first lens unit L1 is reduced compared with the case in which the first lens unit L1 is moved for focusing, so that it becomes easier to reduce the overall size of the lens system. In addition, close-up shooting, especially shooting from an extremely close distance, can be easily performed. Furthermore, since a relatively light lens unit is moved, a force required for driving the lens unit can be reduced and the focusing speed can be increased.

Although it is described above that the third lens unit L3 is fixed during zooming, it may also be moved approximately perpendicularly to the optical axis in order to move the image plane, thereby to reduce image blur caused by vibration of the system.

In addition, in the first to third embodiments, when fW and fT are focal lengths of the overall system at the wide-angle end and the telephoto end, respectively, f2 is a focal length of the second lens unit L2, e3T is the distance between principal points of the third and fourth lens unit L3 and L4 at the telephoto end when an object located at infinity is in focus, f3 and f4 are the focal lengths of the third and fourth lens units L3 and L4, respectively, and fA is defined as $fA=\sqrt{fW \cdot fT}$, at least one of the following three expressions is satisfied:

$$0.17 < |f2/fA| < 0.30 \quad (1)$$

$$2.05 < e3T/fW < 2.96 \quad (2)$$

$$0.6 < f3/f4 < 0.92 \quad (3)$$

Conditional expression (1) represents a condition for setting a suitable focal length of the second lens unit L2.

When the focal length of the second lens unit L2 is excessively increased, such that the absolute value of f2/fA exceeds the upper limit of conditional expression (1), although aberrations can be sufficiently corrected, the amount by which the second lens unit L2 must be moved to obtain a desired zooming ratio is increased. Accordingly, the overall size of the lens system is increased. Conversely, when the focal length of the second lens unit L2 is excessively reduced, such that the absolute value of f2/fA is reduced below the lower limit of conditional expression (1), the Petzval sum is increased in the negative direction and the image plane becomes tilted. Accordingly, it is difficult to maintain high optical performance.

Conditional expression (2) restricts the distance between the paraxial principal points of the third and fourth lens units L3 and L4 at the telephoto end.

When the distance between the paraxial principal points of the third and fourth lens units L3 and L4 is excessively increased, such that e3T/fW exceeds the upper limit of conditional expression (2), the unused space is increased along the optical axis, so that the overall length of the lens system is increased. Conversely, when the distance between the paraxial principal points of the third and fourth lens units L3 and L4 is excessively reduced, such that e3T/fW is reduced below the lower limit of conditional expression (2), it is difficult to provide a sufficient space for shifting the fourth lens unit L4 to focus on the object at the close position.

Conditional expression (3) restricts the ratio of the focal length of the third lens unit L3 to that of the fourth lens unit L4. More specifically, it represents the condition for setting a suitable back focal length. When the focal length of the third lens unit L3 is excessively increased, such that f3/f4 exceeds the upper limit of conditional expression (3), the back focal length is too long. In addition, when the focal length of the fourth lens unit L4 is excessively reduced, such that f3/f4 exceeds the upper limit of conditional expression (3), variations in aberrations caused by the fourth lens unit L4 are increased. Conversely, when the focal length of the third lens unit L3 is excessively reduced, such that f3/f4 is reduced below the lower limit of conditional expression (3), the back focal length is too short. In addition, when the focal length of the fourth lens unit L4 is excessively increased, such that f3/f4 is reduced below the lower limit of conditional expression (3), the amount by which the fourth lens unit L4 is moved in focusing is increased, so that the overall length of the lens system is increased.

As described above, according to the first to third embodiments, the size of the zoom lens can be reduced by satisfying at least one of conditional expressions (1) to (3). If two or more of conditional expressions (1) to (3) are satisfied, the size of the zoom lens can be further reduced. More preferably, all tree of conditional expressions (1) to (3) should be satisfied at the same time.

More preferably, the ranges of conditional expressions (1) to (3) are set as follows.

$$0.20 < |f2/fA| < 0.28 \quad (1a)$$

$$2.10 < e3T/fW < 2.80 \quad (2a)$$

$$0.65 < f3/f4 < 0.90 \quad (3a)$$

Although the object of the present invention can be achieved by constructing the zoom lens as described above, a zoom lens which has a higher optical performance, and is further reduced in size, may be obtained by satisfying at least one of the following conditions.

(a) When e3W is the distance between principal points of the third and fourth lens units L3 and L4 at the wide-angle end when an object located at infinity is in focus, and M2 is the amount by which the second lens unit L2 is moved toward the object side when zooming from the wide-angle end to the telephoto end, then:

$$(|e3T-e3W|)/M2 < 0.13 \quad (4)$$

Conditional expression (4) restricts the loci along which the second and fourth lens units L2 and L4 are moved during zooming.

When the displacement of the fourth lens unit L4 between the wide-angle end and the telephoto end is increased such that $(|e3T-e3W|)/M2$ exceeds the upper limit of conditional expression (4), the distance between the third and fourth lens units L3 and L4 and the distance between the fourth lens unit L4 and the image plane IP must be increased, so that the overall length of the lens system is increased.

More preferably, the upper limit of conditional expression (4) is set as follows:

$$(|e3T-e3W|)/M2 < 0.11 \quad (4a)$$

(b) When $\beta 2W$ and $\beta 2T$ are the lateral magnifications of the second lens unit L2 at the wide-angle end and at the telephoto end, respectively, and Z is the zoom ratio of the entire system (Z=fT/fW), then:

$$0.95 < \mathrm{Log}(\beta 2T/\beta 2W)/\mathrm{Log}(Z) < 1.24 \quad (5)$$

Conditional expression (5) represents a condition for setting a suitable rate of the zooming effect obtained by the second lens unit L2.

When Log(β2T/β2W)/Log(Z) is above the upper limit of conditional expression (5), the zooming effect obtained by the second lens unit is too large and it is difficult to correct aberrations such as the curvature of the image plane. Conversely, when Log(β2T/β2W)/Log(Z) is below the lower limit of conditional expression (5), the zooming effect obtained by the other lens units is too large and it is difficult to correct spherical aberration, distortion, etc.

More preferably, the range of conditional expression (5) is set as follows:

$$0.95 < \text{Log}(\beta 2T/\beta 2W)/\text{Log}(Z) < 1.15 \quad (5a)$$

(c) A third condition is to form the third lens unit L3 of at least one positive lens, and a negative lens having a concave surface which has a higher optical power in the direction toward the image side than in the direction toward the object side. The positive lens and the negative lens are arranged in that order from the object side.

According to the third condition, the size of the entire lens unit can be further reduced.

(d) A fourth condition is to place the aperture stop SP next to the third lens unit L3 on the object side, and to always fix the aperture stop SP during zooming.

According to the fourth condition, the size of the lens unit can be further reduced and the construction of a lens barrel can be simplified.

By disposing the aperture stop SP at a position as close to the front lens unit (first lens unit L1) as possible, the position at which an off-axis light beam passes through the front lens can be made closer to the optical axis. Accordingly, the diameter of the lens can be reduced. In addition, when the aperture stop SP is fixed, it is not necessary to move a mechanism including the aperture stop SP, so that the structure of the lens barrel can be simplified and the outside diameter of the lens including the lens barrel can be reduced.

(e) When M1 is the amount by which the first lens unit L1 is moved and M2 is the amount by which the second lens unit L2 is moved during zooming from the wide-angle end to the telephoto end, then:

$$0.7 < M1/M2 < 1.4 \quad (6)$$

Both M1 and M2 are defined as positive values irrespective of the moving directions.

Conditional expression (6) restricts the ratio of the amount by which the first lens unit L1 is moved to the amount by which the second lens unit L2 is moved in zooming from the wide-angle end to the telephoto end, in order to obtain high optical performance over the entire zooming range and over the entire range of a distance to an object. More specifically, conditional expression (6) represents a condition for reliably correcting aberrations which occur during zooming and reducing the effective diameter of the first lens unit L1 and the overall length of the lens system in a balanced manner. When the amount of movement of the first lens unit L1 is excessively increased, such that M1/M2 exceeds the upper limit of conditional expression (6), the distance between the first lens unit L1 and the aperture stop is increased in the range from the intermediate focal length to the telephoto end. Thus, the off-axis light beam is incident onto the first lens unit at a position distant from the lens optical axis, so that the effective diameter of the first lens unit L1 is increased. Conversely, when the amount of movement of the first lens unit L1 is excessively reduced, such that M1/M2 is reduced beyond the lower limit of conditional expression (6), it is difficult to reduce the overall length of the lens system at the wide-angle end, and it is also difficult to obtain a desired zooming ratio.

More preferably, the range of conditional expression (6) is set as follows:

$$0.85 < M1/M2 < 1.25 \quad (6a)$$

(f) When R2i is the radius of curvature of an $i^{th}$ surface of the lenses in the second lens unit counted from the object side (the radius of curvature is the paraxial radius of curvature when the lens surface of the lens is aspherical), then:

$$0.65 < |R22/R23| < 0.79 \quad (7)$$

Conditional Expression (7) represents a condition for compensating for a coma aberration, the curvature of the image plane, and flare in a balanced manner.

When the absolute value of R22/R23 exceeds the upper limit of conditional expression (7), the coma aberration is increased. Conversely, when the absolute value of R22/R23 is below the lower limit of conditional expression (7), the image plane is deformed, such that it is concave toward the object side. Furthermore, when the absolute value of R22/R23 is above or below the range of conditional expression (7), large flare occurs.

More preferably, the range of conditional expression (7) is set as follows:

$$0.7 < |R22/R23| < 0.78 \quad (7a)$$

According to the above-described first to third embodiments, a small zoom lens that has a high zooming ratio, such as 10, and a large aperture ratio, such that its F number is approximately 1.6, that exhibits high optical performance, and that includes a small number of lenses, can be obtained.

Figure 13:
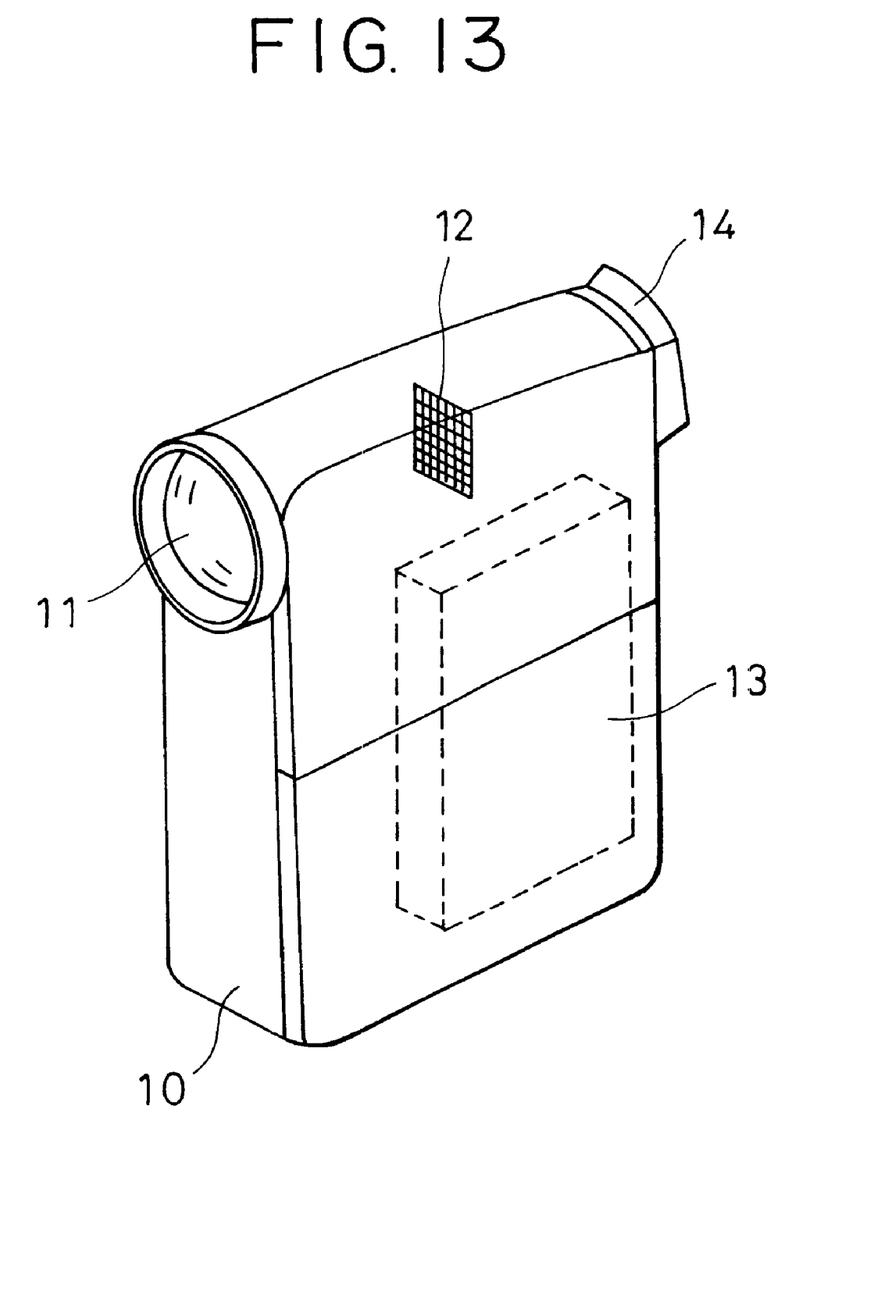
FIG. 13 is a diagram showing a video camera in which a zoom lens according to the present invention is installed.

With reference to FIG. 13, an example of a video camera using the zoom lens of the present invention as an imaging system will be described below.

In FIG. 13, reference numeral 10 denotes a main body of a video camera, reference numeral 11 denotes an imaging optical system constructed of a zoom lens according to the present invention, reference numeral 12 denotes a solid-state imaging device, such as a CCD, which receives light emitted from the imaging optical system 11, reference numeral 13 denotes a recording unit which records an image of an object received by the imaging device 12, and reference numeral 14 denotes a finder through which the image of the object displayed on a display device (not shown) is observed. The display device is formed of, for example, a liquid crystal panel, on which the image formed on the imaging device 12 is displayed.

Accordingly, a small optical apparatus which exhibits high optical performance can be obtained by installing the zoom lens of the present invention in a video camera, an electronic camera such as a digital still camera, etc.

Next, first to third numerical examples of the present invention will be shown below. In each of the numerical examples, Ri represents the radius of curvature of an $i^{th}$ optical surface counted from the object side, and Di represents the distance between the $i^{th}$ surface and the $i+1^{th}$ surface, Ni and vi represent the refractive index and the Abbe number, respectively, of the material of an $i^{th}$ optical member with respect to the d-line. In addition, first to fourth surfaces counted from the image side form the glass block P. When k is an eccentricity, B, C, D, E, F, . . . , are aspherical surface coefficients, and x is a displacement from the top point of the surface along the optical axis at a position where the height from the optical axis is h, the shape of the aspherical surface is expressed as:

$$x = (h^2/R)/[1+[1-(1+k)(h/R)^2]^{1/2}] + Bh^4 + Ch^6 + Dh^8 + Eh^{10} + Fh^{12} \ldots$$

where R is the paraxial radius of curvature. In each of the numerical examples, the expression "e–Z" means "$10^{-z}$". In addition, values corresponding to conditional expressions used in first to third numerical examples are shown in Table 1.

First Numerical Example
f = 1 to 9.68   Fno = 1.66 to 2.91   2ω = 56.5 to 6.3

| | | | |
|---|---|---|---|
| R1 = 8.746 | D1 = 0.20 | N1 = 1.846660 | ν1 = 23.9 |
| R2 = 3.974 | D2 = 0.88 | N2 = 1.696797 | ν2 = 55.5 |
| R3 = −30.436 | D3 = 0.04 | | |
| R4 = 3.364 | D4 = 0.59 | N3 = 1.696797 | ν3 = 55.5 |
| R5 = 7.362 | D5 = variable | | |
| R6 = 4.873 | D6 = 0.12 | N4 = 1.882997 | ν4 = 40.8 |
| R7 = 0.842 | D7 = 0.44 | | |
| R8* = −1.166 | D8 = 0.27 | N5 = 1.665320 | ν5 = 55.4 |
| R9 = 1.368 | D9 = 0.35 | N6 = 1.846660 | ν6 = 23.9 |
| R10 = −15.923 | D10 = variable | | |
| R11 = aperture stop | D11 = 0.17 | | |
| R12* = 1.319 | D12 = 0.81 | N7 = 1.583126 | ν7 = 59.4 |
| R13* = −4.518 | D13 = 0.04 | | |
| R14 = 1.611 | D14 = 0.13 | N8 = 1.922860 | ν8 = 18.9 |
| R15 = 1.136 | D15 = variable | | |
| R16* = 2.418 | D16 = 0.60 | N9 = 1.583126 | ν9 = 59.4 |
| R17 = −1.785 | D17 = 0.12 | N10 = 1.922860 | ν10 = 18.9 |
| R18 = −2.952 | D18 = variable | | |
| R19 = ∞ | D19 = 0.38 | N11 = 1.516800 | ν11 = 64.2 |
| R20 = ∞ | D20 = 0.15 | N12 = 1.552320 | ν12 = 63.4 |
| R21 = ∞ | D21 = 0.18 | N13 = 1.556710 | ν13 = 58.6 |
| R22 = ∞ | | | |

| Variable Spacing | Focal Length | | |
|---|---|---|---|
| | 1.00 | 5.49 | 9.68 |
| D5 | 0.13 | 2.62 | 3.09 |
| D10 | 1.58 | 0.37 | 0.15 |
| D15 | 1.22 | 0.57 | 1.35 |
| D18 | 0.53 | 1.17 | 0.39 |

*aspherical surface

Aspherical Surface Coefficients

| | | | | |
|---|---|---|---|---|
| R8 | k = 2.75833e+00 | B = 2.75389e−01 | C = −4.78234e−02 | D = 1.40485e+00 |
| | E = 6.15468e+00 | F = −8.31155e+00 | | |
| R12 | k = −1.42268e+00 | B = 1.32320e−02 | C = 4.66899e−02 | D = 2.96338e−03 |
| | E = 4.82698e−03 | F = 0.0 | | |
| R13 | k = −2.14049e+01 | B = −6.92318e−03 | C = 8.55695e−03 | D = 1.25472e−02 |
| | E = −2.70422e−05 | F = 0.0 | | |
| R16 | k = −7.31922e+00 | B = 3.45944e−02 | C = =6.98642e−03 | D = 4.28867e−03 |
| | E = −5.31229e−02 | F = 5.64814e−02 | | |

Second Numerical Example
f = 1 to 9.52   Fno = 1.66 to 2.74   2ω = 56.5 to 6.5

| | | | |
|---|---|---|---|
| R1 = 6.938 | D1 = 0.23 | N1 = 1.846660 | ν1 = 23.9 |
| R2 = 3.633 | D2 = 1.26 | N2 = 1.516330 | ν2 = 64.1 |
| R3 = −16.603 | D3 = 0.03 | | |
| R4 = 2.893 | D4 = 0.78 | N3 = 1.696797 | ν3 = 55.5 |
| R5 = 7.514 | D5 = variable | | |
| R6 = 5.442 | D6 = 0.12 | N4 = 1.882997 | ν4 = 40.8 |
| R7 = 0.753 | D7 = 0.41 | | |
| R8* = −1.000 | D8 = 0.14 | N5 = 1.665320 | ν5 = 55.4 |
| R9 = 1.125 | D9 = 0.42 | N6 = 1.846660 | ν6 = 23.9 |
| R10 = −8.116 | D10 = variable | | |
| R11 = aperture stop | D11 = 0.17 | | |
| R12* = 1.880 | D12 = 0.75 | N7 = 1.583126 | ν7 = 59.4 |
| R13* = −2.087 | D13 = 0.03 | | |
| R14 = 5.484 | D14 = 0.43 | N8 = 1.712995 | ν8 = 53.9 |
| R15 = −3.443 | D15 = 0.12 | N9 = 1.846660 | ν9 = 23.9 |
| R16 = 3.676 | D16 = variable | | |
| R17* = 1.912 | D17 = 0.49 | N10 = 1.516330 | ν10 = 95.1 |
| R18 = −6.717 | D18 = variable | | |
| R19 = ∞ | D19 = 0.38 | N11 = 1.516800 | ν11 = 64.2 |
| R20 = ∞ | D20 = 0.15 | N12 = 1.552320 | ν12 = 63.4 |
| R21 = ∞ | D21 = 0.18 | N13 = 1.556710 | ν13 = 58.6 |
| R22 = ∞ | | | |

| Variable Spacing | Focal Length | | |
|---|---|---|---|
| | 1.00 | 4.92 | 9.52 |

-continued

| | | | |
|---|---|---|---|
| D5 | 0.14 | 2.28 | 2.69 |
| D10 | 1.42 | 0.34 | 0.14 |
| D15 | 1.72 | 1.08 | 1.86 |
| D18 | 0.53 | 1.17 | 0.39 |

*aspherical surface

Aspherical Surface Coefficients

| | | | | |
|---|---|---|---|---|
| R8 | k = −5.94087e+00 | B = −7.64728e−01 | C = 1.15668e+00 | D = 9.87489e−01 |
| | E = −1.15001e+01 | F = −3.37181e+01 | | |
| R12 | k = −5.97879e+00 | B = 4.66179e−02 | C = −4.48768e−03 | D = −1.24657e−03 |
| | E = −2.75809e−03 | F = 0.0 | | |
| R13 | k = −2.19001e+00 | B = −1.01764e−02 | C = 1.89549e−02 | D = 5.68239e−03 |
| | E = −1.01019e−02 | F = 0.00 | | |
| R17 | k = −3.43739e+00 | B = 4.07514e−02 | C = −2.22021e−02 | D = 6.82069e−02 |
| | E = 1.48043e−01 | F = −9.22867e−02 | | |

Third Numerical Example
f = 1 to 9.79   Fno = 1.67 to 2.53   2ω = 60.7 to 6.8

| | | | |
|---|---|---|---|
| R1 = 9.985 | D1 = 0.25 | N1 = 1.846660 | ν = 23.9 |
| R2 = 4.715 | D2 = 1.33 | N2 = 1.696797 | ν2 = 55.5 |
| R3 = −43.068 | D3 = 0.04 | | |
| R4 = 3.699 | D4 = 0.72 | N3 = 1.696797 | ν3 = 55.5 |
| R5 = 7.666 | D5 = variable | | |
| R6 = 4.936 | D6 = 0.13 | N4 = 1.882997 | ν4 = 40.8 |
| R7 = 0.984 | D7 = 0.65 | | |
| R8* = −1.283 | D8 = 0.29 | N5 = 1.665320 | ν5 = 55.4 |
| R9 = 1.811 | D9 = 0.34 | N6 = 1.846660 | ν6 = 23.9 |
| R10 = −16.418 | D10 = variable | | |
| R11 = aperature stop | D11 = 0.18 | | |
| R12* = 1.341 | D12 = 0.77 | N7 = 1.583126 | ν7 = 59.4 |
| R13* = −3.825 | D13 = 0.04 | | |
| R14 = 1.763 | D14 = 0.14 | N8 = 1.922860 | ν8 = 18.9 |
| R15 = 1.188 | D15 = variable | | |
| R16* = 2.385 | D16 = 0.58 | N9 = 1.583126 | ν9 = 59.4 |
| R17 = −1.984 | D17 = 0.13 | N10 = 1.922860 | ν10 = 18.9 |
| R18 = −3.305 | D18 = variable | | |
| R19 = ∞ | D19 = 0.42 | N11 = 1.516800 | ν11 = 64.2 |
| R20 = ∞ | D20 = 0.17 | N12 = 1.552320 | ν12 = 63.4 |
| R21 = ∞ | D21 = 0.20 | N13 = 1.556710 | ν13 = 58.6 |
| R22 = ∞ | | | |

| Variable | Focal Length | | |
|---|---|---|---|
| Spacing | 1.00 | 5.38 | 9.79 |
| D5 | 0.14 | 2.95 | 3.49 |
| D10 | 1.72 | 0.41 | 0.16 |
| D15 | 1.12 | 0.57 | 1.26 |
| D18 | 0.57 | 1.12 | 0.43 |

*aspherical surface

Aspherical Surface Coefficients

| | | | | |
|---|---|---|---|---|
| R8 | k = 2.07795e+00 | B = 1.68969e−01 | C = −9.41890e−02 | D = 3.81082e−01 |
| | E = 3.02251e+00 | F = −5.25468e+00 | | |
| R12 | k = −1.47258e+00 | B = 1.10992e−02 | C = 9.89745e−03 | D = 3.92330e−03 |
| | E = 8.06045e−03 | F = 0.0 | | |
| R13 | k = −1.52663e+01 | B = −8.44595e−03 | C = 1.16641e−02 | D = 2.10138e−02 |
| | E = −2.19755e−04 | F = 0.0 | | |
| R16 | k = −6.68992e+00 | B = 3.81226e−02 | C = −1.49467e−02 | D = 8.61184e−04 |
| | E = 8.12508e−04 | F = −1.03482e−02 | | |

TABLE 1

| Conditional Expression | Numerical Example | | |
|---|---|---|---|
| | First | Second | Third |
| (1) | 0.24 | 0.22 | 0.27 |
| (2) | 2.30 | 2.69 | 2.17 |
| (3) | 0.85 | 0.70 | 0.82 |
| (4) | 0.098 | 0.107 | 0.092 |
| (5) | 1.02 | 1.02 | 1.03 |
| (6) | 1.07 | 0.97 | 1.15 |
| (7) | 0.72 | 0.75 | 0.77 |

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens comprising, in order from an object side to an image side of said zoom lens:

a first lens unit having positive optical power;

a second lens unit having negative optical power;

a third lens unit which has positive optical power and which does not move for zooming; and a fourth lens unit having positive optical power, wherein when zooming from a wide-angle end to a telephoto end, the first lens unit is moved toward the object side and the second lens unit is moved toward the image side, whereby the distance between the first and second lens units is increased, and wherein, when fW and fT are focal lengths of the overall system at the wide-angle end and the telephoto end, respectively, f2 is a focal length of the second lens unit, e3T is the distance between principal points of the third and fourth lens units at the telephoto end when an object located at infinity is in focus, f3 and f4 are focal lengths of the third and fourth lens units, respectively, and fA is defined as $fA=\sqrt{fW \cdot fT}$, the following expressions are satisfied:

$0.17<|f2/fA|<0.30$, $2.05<e3T/fW<2.96$, and $0.6<f3/f4<0.92$.

2. A zoom lens according to claim 1, wherein at least one of the following expressions is satisfied:

$0.20<|f2/fA|<0.28$, $2.10<e3T/fW<2.80$, and $0.65<f3/f4<0.90$.

3. A zoom lens according to claim 1, wherein the fourth lens unit is moved during zooming and focusing.

4. A zoom lens according to claim 3, wherein the fourth lens unit is moved along a locus which is convex toward the object side in zooming from the wide-angle end to the telephoto end.

5. A zoom lens according to claim 1, wherein, when e3W is the distance between the principal points of the third and fourth lens units at the wide-angle end when the object located at infinity is in focus, and M2 is the amount by which the second lens unit is moved in zooming from the wide-angle end to the telephoto end, the following expression is satisfied:

$(|e3t-e3w|)/M2<0.13$.

6. A zoom lens according to claim 1, wherein, when e3W is the distance between the principal points of the third and fourth lens units at the wide-angle end when the object located at infinity is in focus, and M2 is the amount by which the second lens unit is moved in zooming from the wide-angle end to the telephoto end, the following expression is satisfied:

$(|e3t-e3w|)/M2<0.11$.

7. A zoom lens according to claim 1, wherein when β2W and β2T are lateral magnifications of the second lens unit at the wide-angle end and at the telephoto end, respectively, and Z is the zoom ratio of the overall system, where Z=fT/fW, the following expression is satisfied:

$0.95<Log(β2T/β2W)/Log(Z)<1.24$.

8. A zoom lens according to claim 1, wherein when β2W and β2T are lateral magnifications of the second lens unit at the wide-angle end and at the telephoto end, respectively, and Z is the zoom ratio of the overall system, where Z=fT/fW, the following expression is satisfied:

$0.95<Log(β2T/β2W)/Log(Z)<1.15$.

9. A zoom lens according to claim 1, wherein the third lens unit comprises:

at least one positive lens; and a negative lens having a concave surface which has a higher optical power in the direction toward the image side than in the direction toward the object side, the concave surface facing toward the image side.

10. A zoom lens according to claim 1, further comprising an aperture stop located next to the third lens unit, on the object side, wherein the aperture stop does not move during zooming.

11. A zoom lens according to claim 1, wherein when M1 is the amount by which the first lens unit is moved in zooming from the wide-angle end to the telephoto end and M2 is the amount by which the second lens unit is moved in zooming from the wide-angle end to the telephoto end, the following expression is satisfied:

$0.7<M1/M2<1.4$.

12. A zoom lens according to claim 1, wherein when M1 is the amount by which the first lens unit is moved in zooming from the wide-angle end to the telephoto end and M2 is the amount by which the second lens unit is moved in zooming from the wide-angle end to the telephoto end, the following expression is satisfied:

$0.85<M1/M2<1.25$.

13. A zoom lens according to claim 1, wherein when R2i is the radius of curvature of an $i^{th}$ surface in the second lens unit counted from the object side, the radius of curvature being the paraxial radius of curvature when the surface is aspherical, the following expression is satisfied:

$0.65<|R22/R23|<0.79$.

14. A zoom lens according to claim 1, wherein when R2i is the radius of curvature of an $i^{th}$ surface in the second lens unit counted from the object side, the radius of curvature being the paraxial radius of curvature when the surface is aspherical, the following expression is satisfied:

$0.7<|R22/R23|<0.78$.

15. A zoom lens according to claim 1, where at least a part of the third lens unit is moved in a direction perpendicular to an optical axis so that an image formed by the zoom lens is also moved.

16. A zoom lens according to claim 1, where the zoom lens forms an image on a photoelectric transducer.

17. A camera comprising:
a zoom lens, said zoom lens comprising, in order from an object side to an image side of said zoom lens:
a first lens unit having positive optical power;
a second lens unit having negative optical power;
a third lens unit which has positive optical power and which does not move for zooming; and
a fourth lens unit having positive optical power,
wherein when zooming from a wide-angle end to a telephoto end, the first lens unit is moved toward the object side and the second lens unit is moved toward the image side, whereby the distance between the first and second lens units is increased, and
wherein, when fW and fT are focal lengths of the overall system at the wide-angle end and the telephoto end, respectively, f2 is a focal length of the second lens unit, e3T is the distance between principal points of the third and fourth lens units at the telephoto end when an object located at infinity is in focus, f3 and f4 are focal lengths of the third and fourth lens units, respectively, and fA is defined as fA=√fw·fT, the following expressions are satisfied:

$$0.17<|f2/fA|<0.30,$$

$$2.05<e3T/fW<2.96,$$

and $$0.6<f3/f4<0.92;$$

and
a photoelectric transducer that receives an image formed by said zoom lens.

18. A camera according to claim 17, wherein at least one of the following expressions is satisfied:

$$0.20<|f2/fA|<0.28,$$

$$2.10<e3T/fW<2.80,$$

and $$0.65<f3/f4<0.90.$$

19. A zoom lens comprising, in order from an object side to an image side of said zoom lens:
a first lens unit having positive optical power;
a second lens unit having negative optical power;
a third lens unit which has positive optical power and which does not move for zooming; and
a fourth lens unit having positive optical power,
wherein when zooming from a wide-angle end to a telephoto end, the first lens unit is moved toward the object side and the second lens unit is moved toward the images side, whereby the distance between the first and second lens units is increased,
wherein said zoom lens further comprising an aperture stop which does not move during zooming, and
wherein, when fW is focal length of the overall system at the wide-angle end, e3T is the distance between principal points of the third and fourth lens units at the telephoto end when an object located at infinity is in focus, the following expression is satisfied:

$$2.05<e3T/fW<2.96.$$

20. A zoom lens according to claim 19, wherein when fW and fT are focal lengths of the overall system at the wide-angle end and the telephoto end, respectively, f2, f3 and f4 are focal lengths of the second, third and fourth lens units, respectively, and fA is defined as fA=√fW·fT, at least one of the following expressions is satisfied:

$$0.17<|f2/fA|<0.30,$$

and $$0.65<f3/f4<0.92.$$

21. A zoom lens according to claim 19, wherein the aperture stop is located next to the third lens unit, on the object side.

22. A zoom lens according to claim 19, wherein the zoom lens forms an image on a photoelectric transducer.

23. A camera comprising:
a zoom lens comprising, in order from an object side to an image side of said zoom lens:
a first lens unit having positive optical power;
a second lens unit having negative optical power;
a third lens unit which has positive optical power and which does not move for zooming; and
a fourth lens unit having positive optical power,
wherein when zooming from a wide-angle end to a telephoto end, the first lens unit is moved toward the object side and the second lens unit is moved toward the image side, whereby the distance between the first and second lens units is increased,
wherein said zoom lens further comprising an aperture stop which does not move during zooming, and
wherein, when fW is focal length of the overall system at the wide-angle end, e3T is the distance between principal points of the third and fourth lens units at the telephoto end when an object located at infinity is in focus, the following expression is satisfied:

$$2.05<e3T/fW<2.96;$$

and
a photoelectric transducer that receives an image formed by said zoom lens.

* * * * *

UNITED STATES PATENT AND TRADEMARK OFFICE
CERTIFICATE OF CORRECTION

PATENT NO. : 6,674,580 B2
DATED : January 6, 2004
INVENTOR(S) : Akihisa Horiuchi It is certified that error appears in the above-identified patent and that said Letters Patent is hereby corrected as shown below:

<u>Column 13,</u>
Line 63, "$(|e3t-e3w|)/M2<0.13$." should read -- $(|e3T-e3W|)/M2<0.13$. --.

<u>Column 14,</u>
Line 6, "$(|e3t-e3w|)/M2<0.11$." should read -- $(|e3T-e3W|)/M2<0.11$. --.

Signed and Sealed this

Twenty-ninth Day of June, 2004

JON W. DUDAS
*Acting Director of the United States Patent and Trademark Office*